United States Patent
Sofka et al.

(10) Patent No.: US 9,646,229 B2
(45) Date of Patent: May 9, 2017

(54) METHOD AND SYSTEM FOR BONE SEGMENTATION AND LANDMARK DETECTION FOR JOINT REPLACEMENT SURGERY

(71) Applicants: Michal Sofka, Franklin Park, NJ (US); Meizhu Liu, Plainsboro, NJ (US); Dijia Wu, North Brunswick, NJ (US); Shaohua Kevin Zhou, Plainsboro, NJ (US)

(72) Inventors: Michal Sofka, Franklin Park, NJ (US); Meizhu Liu, Plainsboro, NJ (US); Dijia Wu, North Brunswick, NJ (US); Shaohua Kevin Zhou, Plainsboro, NJ (US)

(73) Assignee: SIEMENS MEDICAL SOLUTIONS USA, INC., Malvern, PA (US)

( * ) Notice: Subject to any disclaimer, the term of this patent is extended or adjusted under 35 U.S.C. 154(b) by 749 days.

(21) Appl. No.: 14/041,029

(22) Filed: Sep. 30, 2013

(65) Prior Publication Data
US 2014/0093153 A1 Apr. 3, 2014

Related U.S. Application Data

(60) Provisional application No. 61/706,958, filed on Sep. 28, 2012.

(51) Int. Cl.
G06K 9/00 (2006.01)
G06K 9/66 (2006.01)
G06T 7/00 (2017.01)
G06T 7/10 (2017.01)

(52) U.S. Cl.
CPC .............. *G06K 9/66* (2013.01); *G06T 7/0014* (2013.01); *G06T 7/10* (2017.01); *G06T 2207/10081* (2013.01); *G06T 2207/10088* (2013.01); *G06T 2207/20081* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 5,452,407 A * | 9/1995 | Crook | A61B 17/7059 345/420 |
| 5,682,886 A * | 11/1997 | Delp | A61B 17/154 128/920 |
| 7,383,164 B2 | 6/2008 | Aram et al. | |
| 7,892,236 B1 | 2/2011 | Bonutti | |
| 8,480,679 B2 | 7/2013 | Park et al. | |
| 8,974,539 B2 * | 3/2015 | Bojarski | A61F 2/30942 623/20.35 |
| 2005/0025347 A1 * | 2/2005 | Makram-Ebeid | A61B 6/08 382/128 |

(Continued)

*Primary Examiner* — Jason Heidemann

(57) ABSTRACT

A method and system for automatic bone segmentation and landmark detection for joint replacement surgery is disclosed. A 3D medical image of at least a target joint region of a patient is received. A plurality bone structures are automatically segmented in the target joint region of the 3D medical image and a plurality of landmarks associated with a joint replacement surgery are automatically detected in the target joint region of the 3D medical image. The boundaries of segmented bone structures can then be interactively refined based on user inputs.

33 Claims, 12 Drawing Sheets

(56) References Cited

U.S. PATENT DOCUMENTS

| | | | |
|---|---|---|---|
| 2005/0113663 A1* | 5/2005 | Tamez-Pena | A61B 5/055 600/407 |
| 2005/0149050 A1 | 7/2005 | Stifter et al. | |
| 2005/0197814 A1 | 9/2005 | Aram et al. | |
| 2005/0256389 A1 | 11/2005 | Koga et al. | |
| 2008/0243127 A1* | 10/2008 | Lang | A61B 5/4528 606/87 |
| 2009/0190815 A1* | 7/2009 | Dam | A61B 5/055 382/131 |
| 2009/0208082 A1* | 8/2009 | Westerhoff | G06T 7/0081 382/131 |
| 2009/0270868 A1 | 10/2009 | Park et al. | |
| 2010/0067768 A1* | 3/2010 | Ionasec | G06K 9/621 382/131 |
| 2010/0070249 A1* | 3/2010 | Ionasec | G06F 19/321 703/2 |
| 2010/0074499 A1* | 3/2010 | Wels | G06T 7/143 382/131 |
| 2010/0094308 A1 | 4/2010 | Tatsumi et al. | |
| 2010/0128954 A1* | 5/2010 | Ostrovsky-Berman | G06T 7/0081 382/131 |
| 2010/0220907 A1* | 9/2010 | Dam | G06K 9/34 382/131 |
| 2011/0009868 A1 | 1/2011 | Sato | |
| 2011/0282473 A1* | 11/2011 | Pavlovskaia | A61B 5/055 700/98 |
| 2012/0172882 A1 | 7/2012 | Sato | |
| 2013/0324857 A1* | 12/2013 | Kurillo | A61B 5/1127 600/476 |

\* cited by examiner 202    204    206

400

US 9,646,229 B2

METHOD AND SYSTEM FOR BONE SEGMENTATION AND LANDMARK DETECTION FOR JOINT REPLACEMENT SURGERY

This application claims the benefit of U.S. Provisional Application No. 61/706,958, filed Sep. 28, 2012, the disclosure of which is herein incorporated by reference.

BACKGROUND OF THE INVENTION

The present invention relates to bone segmentation and landmark detection for joint replacement surgery, and more particularly, to bone segmentation and landmark detection in medical image data during a planning stage of joint replacement surgery.

According to the American Academy of Orthopedic Surgeons, total knee replacement surgery is performed for more than 500,000 patients each year in the United States alone. This number has been rising in recent decades partly due to the aging population, but also due to improved outcomes of the procedure, streamlined workflow, and longevity of knee implants, which have resulted in more patients being eligible for the procedure. The goal of total knee replacement surgery is to replace a damaged knee joint and as a result, alleviate pain, improve mobility, and improve the patient's quality of life.

In recent years, the total knee replacement surgery workflow has improved by introducing personalized instruments and patient-specific knee implants. Patient-specific surgery reduces the length of the procedure by eliminating several steps (e.g., measurement steps) and minimizes the amount of residual bone during the resection. Patient-specific total knee replacement procedure is typically performed in two stages: a planning stage and an intervention stage. In the planning stage, a magnetic resonance imaging (MRI) or computed tomography (CT) scan of the patient's leg is acquired, and the physician uses the scan to build a full 3D model of the patient's leg. The model is combined with patient information and surgical preferences to create a patient proposal. The proposal is used to manufacture cutting guides and plastic blocks specific for that patient. These instruments are then used to accurately cut the damaged bone and position the implant during the intervention stage.

BRIEF SUMMARY OF THE INVENTION

The present invention provides a method and system for fully automatic bone segmentation and bone landmark detection in medical imaging data for generating a complete 3D model of a patient's joint, such as the knee. Such fully automatic bone segmentation and landmark detection can further streamline the planning stage of joint replacement surgery by reducing the time needed to build highly accurate 3D model of the patient's joint.

In one embodiment, a 3D medical image of at least a target joint region of a patient is received. A plurality bone structures are automatically segmented in the target joint region of the 3D medical image and a plurality of landmarks associated with a joint replacement surgery are automatically detected in the target joint region of the 3D medical image.

These and other advantages of the invention will be apparent to those of ordinary skill in the art by reference to the following detailed description and the accompanying drawings.

DETAILED DESCRIPTION

The present invention is directed to a method for fully automatic bone segmentation and landmark detection in medical image data for joint replacement surgery. Embodiments of the present invention are described herein to give a visual understanding of the bone segmentation and landmark detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
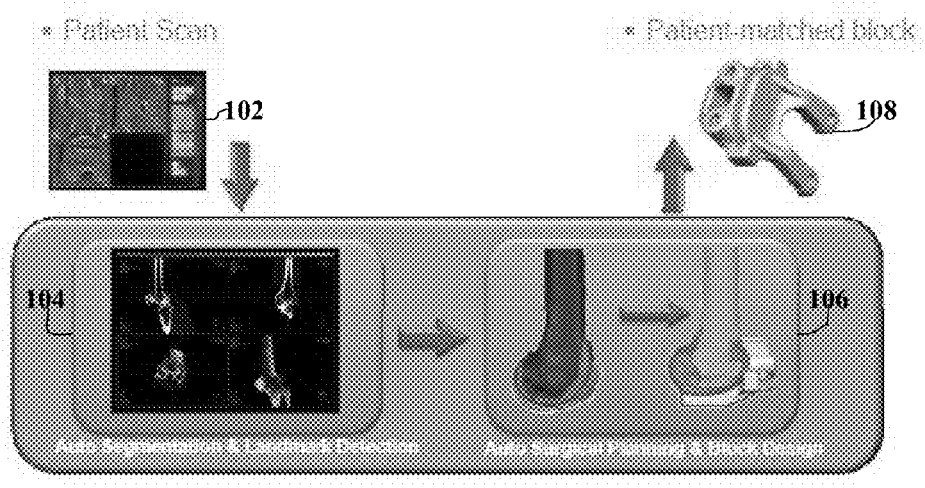
FIG. 1 illustrates a workflow of a planning stage for total knee replacement surgery according to an embodiment of the present invention.

Patient-specific joint replacement surgery is performed in two stages: a planning stage and an intervention stage. FIG. 1 illustrates a workflow of a planning stage for total knee replacement surgery according to an embodiment of the present invention. As illustrated in FIG. 1, in the planning stage, a 3D medical imaging scan 102, such as a magnetic resonance imaging (MRI) scan or a computed tomography (CT) scan of the patient's leg is acquired. According to advantageous embodiment of the present invention, bones are automatically segmented and bone landmarks are automatically detected (104). For total knee replacement surgery, the bones segmented can include the femur, tibia, fibula, and patella, and the landmarks detected can include the medial most distal, lateral most distal, lateral posterior condyle point, anterior cortex point, medial posterior condyle point, femoral head, and ankle center. The segmented bones and detected landmarks result in a full 3D model of the knee, which is used, together with patient information and surgical preferences, to create a patient proposal for the surgery and design patient-specific instruments, such as cutting guides and plastic blocks, for the surgery (106). The patient-specific instruments (108) are then manufactured. In the intervention stage, the patient-specific instruments are used to accurately cut the patient's damaged bone and to position the implant in the patient.

Figure 2:
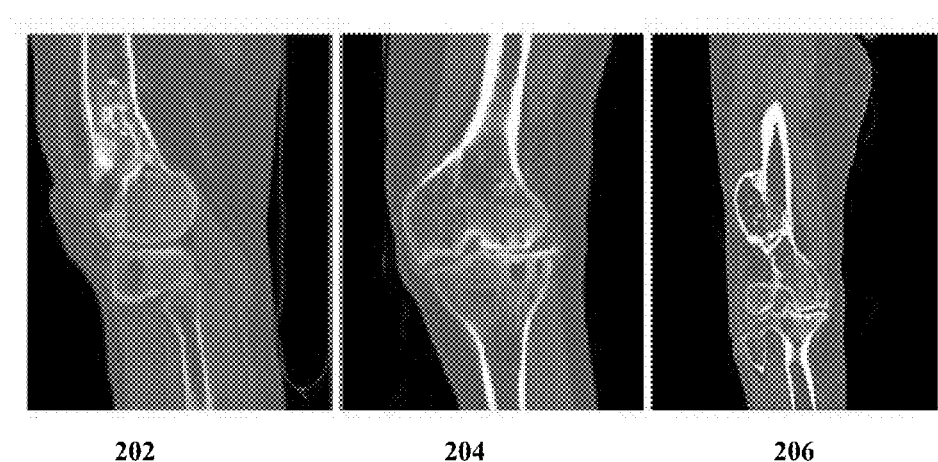
FIG. 2 illustrates exemplary challenges in automatically segmenting bones in a knee region of a patient.

Embodiments of the present invention provide fully automatic bone and landmark detection for generating to complete 3D model of the joint in the planning stage for joint replacement surgery. Automatic bone segmentation and joint replacement is complicated by several challenges. The severity of the disease affecting the joint, such as osteoporosis, can cause deviations of the bone appearance and shape from the healthy population. Imaging artifacts caused by shadowing from metal implants can obscure the bone surface boundary. Further, at a joint, such as the knee, the bones are touching and it is often difficult to accurately determine their separation in medical images due to similar intensity levels near the touching regions. FIG. 2 illustrates exemplary challenges in automatically segmenting bones in a knee region of a patient. As illustrated in FIG. 2, image 202 shows deviations in bone appearance due to disease progression, image 204 shows imaging artifacts caused by shadowing of metal implants, and image 206 shows touching bones.

Embodiments of the present invention address the challenges described above by using a discriminative learning algorithm that accurately detects the surfaces of the bones in a joint region in a medical imaging scan of a patient. The discriminative learning algorithm is trained on a large database of annotated medical images, e.g., 3D CT images. By using this learning-based algorithm, the bone segmentation is data-driven. This way, the accuracy is increased by training on bone images with regions that are difficult to segment, such as cases with the challenges shown in FIG. 2. In the event where the segmentation is ambiguous and results in an incorrect bone boundary, embodiments of the present invention provide interactive editing capability to improve the automatic segmentation results. Embodiments of the present invention also automatically detect several landmarks in the joint region, such as landmarks on the femoral and tibia bones for knee replacement, to further aid in the surgical planning and block design steps.

Figure 3:
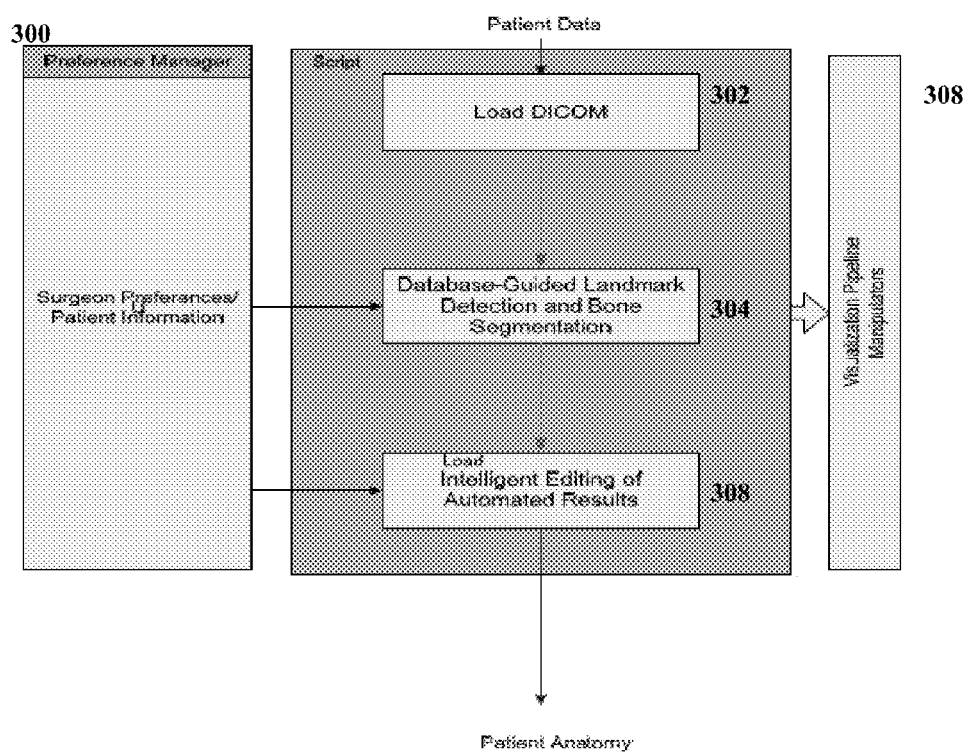
FIG. 3 illustrates a workflow of a software application for bone segmentation and landmark detection for joint replacement surgery planning according to an embodiment of the present invention.

Embodiments of the present invention can be performed using a software application that is implemented by a processor of a computer system executing computer program instructions that are loaded into memory. FIG. 3 illustrates a workflow of a software application for bone segmentation and landmark detection for joint replacement surgery planning according to an embodiment of the present invention. As illustrated in FIG. 3, a preference manager 300 stores and loads surgeon preferences and patient information. Surgeon preferences and patient information can be input through a user interface. User information can include demographic information (e.g., age, gender, etc.), information identifying to the specific joint for the joint replacement surgery (e.g., left knee or right knee), and any other relevant information related to the patient. The software application workflow is implemented by a processor executing computer program instructions (script) to perform the following operations. Patient data, in the form of an MRI or CT DICOM scan, is loaded (302), Database-guided landmark detection and bone segmentation is automatically performed (304), and intelligent editing of automated segmentation results is performed (306). For knee replacement surgery planning, the automatic bone segmentation in the patient's knee image data segments the following bones: femur, tibia, fibula, and patella. The segmentation may include other components such as metal or nearby bones to improve accuracy. For knee replacement surgery planning, the automatic landmark detection detects the following landmarks: femur medial most distal, femur lateral most distal, femur lateral posterior condyle point, femur anterior cortex point, femur medial posterior condyle point, femur lateral epicondyle, femur medial epicondyle, femoral head, and ankle center. Other landmarks may be detected as well, such as landmarks on the tibia including the lateral tubercle, medial tubercle, medial peak, and lateral peak. The intelligent editing provides interactive semi-automatic editing of the segmented data sets. Visualization pipeline 310 provides accurate visualization of the patient's image dataset, as well as the segmentation and detection results.

The architecture of such a software application, at a high level, can include a front-end user interface and back-end services. The application can take the MRI or CT DICOM scan of patient anatomy (e.g., human knee) as input, and generates two types: segmented bones in a mesh representation and detected bone landmarks. In an advantageous implementation, the segmented bones in the mesh representation can be saved as an STL file and the detected bone landmarks can be saved as a text file that identifies the location of each landmark. The application loads user preferences, application configuration, and segmentation and detection models from files stored on a local hard drive (or network mapped drive). The results of the automated bone segmentation and landmark detection can be saved to the same local hard drive (or network mapped drive).

Figure 4:
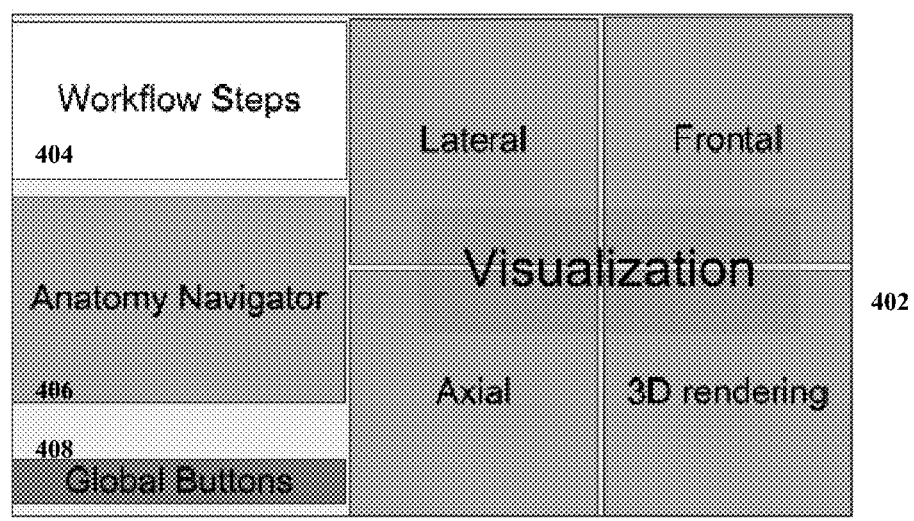
FIG. 4 illustrates a user interface according to an embodiment of the present invention.

The front-end of the software application provides a user interface for visualization of the bone segmentation and landmark detection results, and interaction with the user. FIG. 4 illustrates a user interface according to an embodiment of the present invention. As shown in FIG. 4, the user interface 400 includes a visualization area 402, a workflow steps area 404, an anatomy navigator 406, and global buttons 408. The visualization area 402 is used for rendering bones, metal, 3D medical image volumes, and all mesh and landmark related manipulations. The visualization area includes windows for a frontal view, lateral view, axial view, and 3D rendering. The workflow steps area 404 contains expandable panels with functionality related to each workflow step (e.g., segmentation, segmentation editing, landmark detection). The anatomy navigator 406 provides a listing of all objects being rendered, such as bone meshes, metal meshes, and landmarks, and allows the user to hide each object. The anatomy navigator 406 is also used as a bookmark to visualize the accurate plane of each landmark. The global buttons 408 allow a user to change the layout, change between interaction modes, such as zooming, rotating, and panning, and hide the volume from rendering.

The back-end of the application provides the services and algorithms to support the application front-end. These services are performed by a processor executing computer program instructions loaded into a memory and include algorithms for automatic bone segmentation and landmark detection, algorithms for interactively segmenting metal via thresholding, and algorithms for interactive segmentation and landmark editing.

Figure 5:
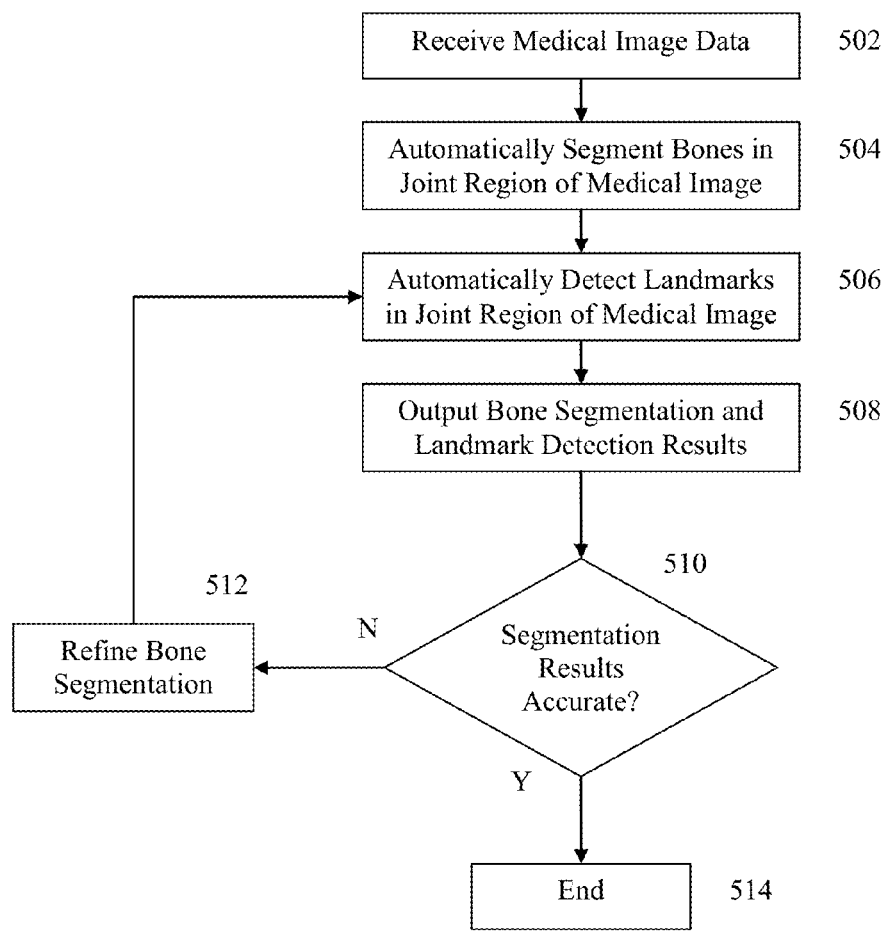
FIG. 5 illustrates a method for bone segmentation and landmark detection for joint replacement surgery according to an embodiment of the present invention.

FIG. 5 illustrates a method for bone segmentation and landmark detection for joint replacement surgery according to an embodiment of the present invention. The method of FIG. 5 transforms medical image data representing a patient's anatomy to segmented bone structures and detected bone landmarks. The method of FIG. 5 is described herein for total knee replacement surgery, but the present invention is not limited thereto. It is to be understood that the method of FIG. 5 may be similarly applied for the planning of joint replacement surgery for other joints, such as the pelvis or the shoulder.

Referring to FIG. 5, at step 502, medical image data of a patient is received. The medical image data may be a 3D MRI or CT scan of at least a target joint region of the patient. The medical image data may be received directly from an image acquisition device, such as an MRI or CT scanner. It is also possible that the medical image data is received by loading previously stored medical image data of the patient.

At step 504, bones are segmented in the target joint region of the medical image data. A joint is a location at which multiple bones connect. Each of the bones that connect at the target joint is segmented in the medical image data. For knee replacement surgery planning, the femur, tibia, fibula, and patella are segmented in the medical image data.

In one embodiment, each of the bones can be segmented independently without considering the locations of the other bones. The bone segmentation for each bone proceeds by first detecting a shape of the bone in a learned sub-space. The learned sub-space is trained based on a database of annotated training data. A separate subspace is learned for each bone structure to be detected for a particular target joint. Given a mean shape, $$\hat{P} = \{\hat{p}_i \in \mathcal{R}^3\}_{i=1}^n,$$

and a number (e.g., 3) modes of shape variation, $U_j = \{u_i^j\}_{i=1}^n$, obtained by procrustus analysis of the training data and principal component analysis (PCA), a new shape in the subspace can be synthesized as a linear combination of the modes:

$$p_i(\lambda_j, r, s, t) = T(r, s, t)\left(\hat{p}_i + \sum_j \lambda_j u_i^j\right)$$

where T(r, s, t) is a similarity matrix defined by rotation r, scale s, and translation t parameters. The parameters in the shape space, $\theta_{pca} = \{\lambda_1, \lambda_2, \lambda_3\}$, are estimated from the current image data using a discriminative classifier trained based on the training data, and the transformation (r, s, t) is determined by estimating the pose in the current image data. The pose parameters (r, s, t) and shape space (PCA) parameters $\theta_{pca} = \{\lambda_1, \lambda_2, \lambda_3\}$ align a mesh representing the boundary of the bone structure to the current image data.

In a possible implementation, pose parameters (r, s, t) of the bone structure can be estimated using Marginal Space Learning (MSL). MSL-based 3D object detection estimates the position, orientation, and scale of the target anatomical structure in the 3D medical image data using a series of discriminative classifiers trained using annotated training data. For example, a method for MSL-based heart chamber segmentation is described in detail in U.S. Pat. No. 7,916,919, issued Mar. 29, 2011, and entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. Accordingly, instead of searching for all parameters simultaneously, MSL decomposes the search space into subsequent estimates of 3D searches over position, orientation, and scale. That is, the detection of the pose parameters is split into three steps: object position estimation, position-orientation estimation, and position-orientation-scale estimation. A separate discriminative classifier is trained based on annotated training data for each of these steps. In the position estimation step, a trained position classifier is used to detect a set of most likely position candidates in the current medical image data. In the position-orientation estimation step, a trained position-orientation classifier searches number of plausible orientations at each of the position candidates to detect a set of most likely position-orientation candidates. In the position-orientation-scale estimation step, a trained position-orientation-scale classifier searches number of plausible scales at each of the position-orientation candidates to detect a set of most likely position-orientation-scale candidates. The PCA shape coefficients $\theta_{pca} = \{\lambda_1, \lambda_2, \lambda_3\}$ are then detected based on the position-orientation-scale candidates using a trained PCA shape coefficient discriminative classifier. In particular, the PCA shape coefficient discriminative classifier searches a set of plausible PCA shape coefficients at each of the detected position-orientation-scale candidates in order to detect the statistical shape model of the target bone structure having the highest probability. For each of the discriminative classifiers (position, position-orientation, position-orientation-scale, and PCA), a probabilistic boosting tree (PBT) classifier may be trained based on the training data.

Once the mesh representing the bone structure boundary is aligned to the current medical image data by estimating the pose parameters (r, s, t) and the shape subspace parameters $\theta_{pca} = \{\lambda_1, \lambda_2, \lambda_3\}$ the mesh is refined. For the mesh refinement, the parameters θ re the locations of the mesh vertices. For each mesh vertex, $p_i$, an adjustment, $p_i \leftarrow p_i + \alpha_i n_i$ is calculated in direction of the normal, $n_i$. $\alpha_i$ is obtained using a trained discriminative classifier:

$$\alpha_i = \arg\max_{-\tau \leq \alpha \leq \tau} = f(+y_i 1 | V_{0:r} p_i \alpha n_i),$$

where τ the search range along the normal. Accordingly, the trained discriminative classifier (e.g., a PBT classifier) searches along the normal direction from each mesh vertex for a point within the search range most likely to be on the bone structure boundary, and the adjustment moves the mesh vertex to the detected point. This adjustment can be interleaved with surface smoothing and updating the normal, $n_i$. In a possible implementation, the mesh refinement can be performed on a three level mesh hierarchy, where $\hat{P}_2 \subset \hat{P}_1 \subset \hat{P}_0$, with the coarser levels being detected first.

Figure 6:
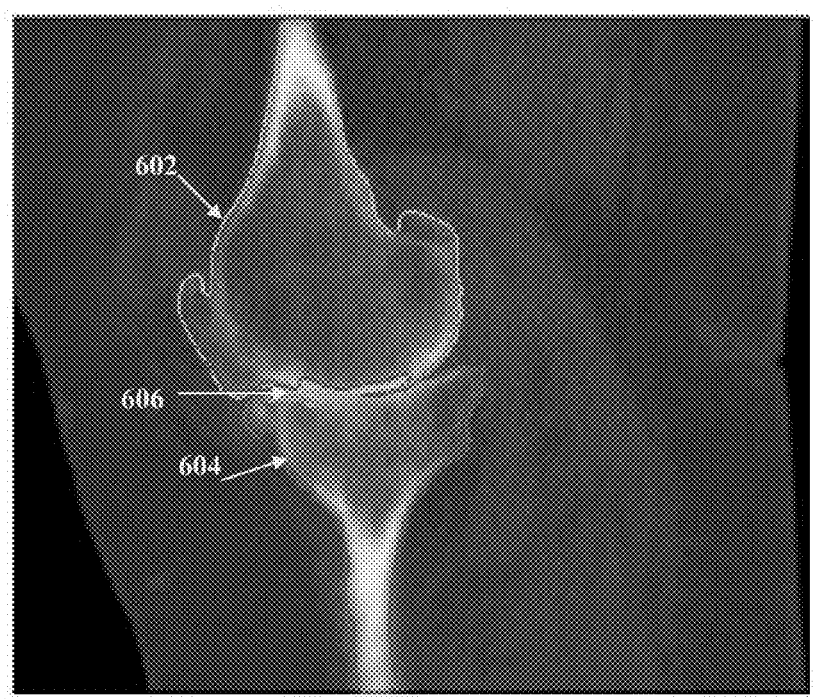
FIG. 6 illustrates overlaps in segmented bone structures.
Figure 7:
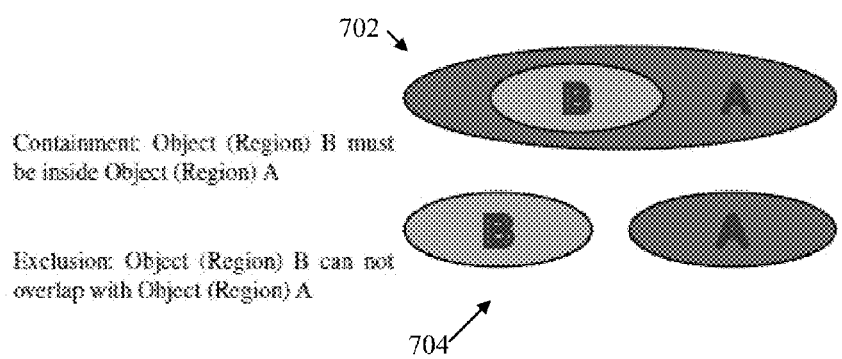
FIG. 7 illustrates examples of spatial constraints used in joint segmentation of multiple bone structures.

The segmentation technique described above processes each bone independently, without considering other nearby bones. As a result, the bone segmentation can produce bone boundaries that are overlapping. FIG. 6 illustrates overlaps in segmented bone structures. As illustrated in FIG. 6, independent segmentation of the femur 602 and the tibia 604 in a medical image has resulted in segmentation overlaps 606. In another embodiment, to solve the problem of overlaps in segmented bone structures, a joint segmentation method can be used to segment multiple bone structures in a target joint region together. In such a joint segmentation method, prior spatial constraints can be utilized to enforce known spatial relationships between the bone structures. FIG. 7 illustrates examples of spatial constraints used in joint segmentation of multiple bone structures. As illustrated in FIG. 7, a containment restraint 702 requires that object B must be inside of object A. An exclusion constraint 704 requires that object B cannot overlap with object A. Accordingly, such an exclusion constraint applied to joint segmentation of multiple bone structures can prevent boundaries of the segmented bone structures from overlapping. Such a joint segmentation method is described in greater detail in U.S. patent application Ser. No. 13/953,825, filed Jul. 30, 2013, which is incorporated herein by reference.

Returning to FIG. 5, at step 506, landmarks are automatically detected in the joint region of the medical image data. The landmarks can include anchor points at which the artificial joint can be anchored in the joint replacement surgery. In an exemplary embodiment, for knee replacement surgery planning, the following landmarks can be detected: femur medial most distal, femur lateral most distal, femur lateral posterior condyle point, femur anterior cortex point, femur medial posterior condyle point, femur lateral epicondyle, femur medial epicondyle, femoral head, and ankle center. Other landmarks may be detected as well, such as landmarks on the tibia including the lateral tubercle, medial tubercle, medial peak, and lateral peak. The landmarks are detected used trained discriminative classifiers while exploiting spatial relationships between the landmark locations. In particular, a respective landmark detector (discriminative classifier) can be trained for each of the landmarks based on annotated training data. For example, a PBT classifier can be trained for each landmark. The anatomical landmarks can be detected sequentially, such that as landmarks are detected, the detected landmarks are used to constrain the search space for those landmarks not yet detected. Since the locations of the multiple landmarks are constrained based on the other detected landmarks, the total landmark detection time can be minimized by optimizing the landmark search strategy. The optimized landmark search strategy determines the search space for each landmark detector (for landmarks that have not yet been detected) based on the already detected landmarks, and then selects the landmark detector have the smallest search space. The selected landmark detector searches its search space and detects the corresponding landmark, and the search strategy is then repeated for the remaining undetected landmarks until all of the landmarks have been detected. In an advantageous implementation, the search spaces of the landmark detectors can be constrained by the segmented bone structures as well. For example, an initial search space for each landmark detector, prior to detecting a first landmark, can be determined based on the segmented bone structures.

The search spaces for the landmark detectors can be determined using a statistical model of the bones and landmarks learned from the training data. The statistical model of the bones and landmarks is represented as model network, such as a discriminative anatomical network (DAN). The network contains learned models for each bone and each landmark. The network encodes relationships between the models and therefore also indirectly encodes the order of steps during the automatic segmentation and landmark detection.

At step 508, bone segmentation and landmark detection results are output. For example, the bone segmentation results and the landmark detection results can be output by displaying the bone segmentation and landmark detection results in a user interface on a display device of a computer system. The bone segmentation and landmark detection results can also be output by storing the bone segmentation results and the landmark detection results on a memory or storage of a computer system. For example, the bone segmentation results may be a mesh representation of the bones stored as an STL file and the landmark detection results may be stored as a text file listing a location of each landmark in the medical image data, At step 510, it is determined whether the bone segmentation results are accurate. For example, a user input may be received indicating that the segmentation results are accepted or a user input may be received indicating that the segmentation results should be refined. In one possible implementation, a user may be prompted, via the user interface, to indicate whether the segmentation results are accepted or not. In another possible implementation, the segmentation results may be considered to be accepted unless a user command to refine the segmentation results is received. If the bone segmentation results are not accurate (e.g., refinement requested by the user), the method proceeds to step 512. If the bone segmentation results are accurate (e.g., accepted by the user), the method proceeds to step 514.

At step 512, the bone segmentation is refined. In particular, an interactive refinement method is performed to refine the bone segmentation based on user inputs. To interactively correct any segmentation errors, a user, via the user interface, can place marks (referred to herein as seeds) inside or outside the bone structure of interest by using brushes or strokes to indicate a few pixels belonging to the foreground or background of the target bone structure. In a manual mode, according to a possible implementation, the seeds are used to subtract or add regions to the existing segmentation (referred to herein as the presegmentation). In a smart-editing mode, according to another possible implementation, the seeds are used in an optimization algorithm to calculate a refined segmentation surface.

In the smart-editing mode, according to an embodiment of the present invention, the information from the presegmentation, the user's input, and the image intensity is integrated to provide an update of the available segmentation. The presegmentation p, determined by the automatic bone segmentation of step 504, can be defined as:

$$p_i = \begin{cases} 1 & \text{if } v_i \text{ was presegmented as foreground} \\ 0 & \text{if } v_i \text{ was presegmented as background} \end{cases} \quad (1)$$

The refinement problem may be defined as a minimization of the energy functional:

$$Q(x) = \sum_{e_{ij}} w_{ij}(x_i - x_j)^2 + \gamma_i \left( \sum_i (1-p_i)x_i + \sum_i p_i(1-x_i) \right), \quad (2)$$

with respect to the foreground indicator function x, defined on vertices of the graph G, where $\gamma_i$ is a parameter indicating the strength of the presegmentation. This energy functional encourages the presegmentation as well as encouraging a data-driven smoothness in the form of the first term. It can be noted that, with a sufficient large $\gamma_i$, the presegmentation will always be returned. However, in an advantageous implementation, $\gamma_i$ depends on the distance of a particular voxel $v_i$ from the seeds and is defined as:

$$\gamma_i = \kappa \exp\left(\frac{d(v_i, v_j)}{\sigma}\right), \quad (3)$$

where $d(v_i, v_j)$ is the minimum distance from $v_i$ to all the seed vertices $v_j \in F, B$. Hence, $\kappa$ is a parameter that indicates the overall strength, and $\sigma$ reflects the domain of influence of the seeds. In an advantageous implementation, $\sigma$ is calculated as:

$$\sigma = \frac{1}{2}\left(\frac{3Vol}{4\pi}\right), \quad (4)$$

where Vol is the volume of the bone structure of interest to be refined. The weights $w_{ij}$ represent the contrast weighting of the graph based on the image intensity values. The weights $w_{ij}$ can be defined as:

$$w_{ij} = \exp(-\beta(g_i - g_j)^2), \quad (5)$$

where $g_i$ represents the gray scale intensity of the image at the vertex (voxel) $v_i$. The seeds are incorporated into the minimization of the energy functional in equation (2) by performing a constrained minimization with respect to the constraints:

$$x_i = \begin{cases} 1 & \text{if } v_i \subset F, \\ 0 & \text{if } v_i \subset B. \end{cases} \quad (6)$$

Figure 8:
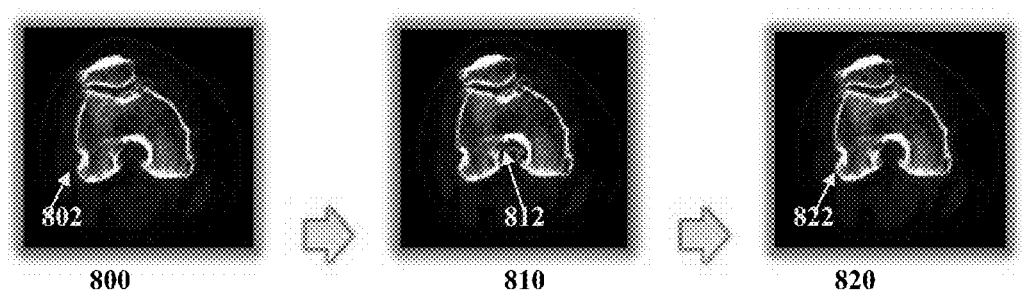
FIG. 8 illustrates exemplary bone segmentation refinement using the smart-editing algorithm.

FIG. 8 illustrates exemplary bone segmentation refinement using the smart-editing algorithm. As illustrated in FIG. 8, image 800 shows bone segmentation results 802 resulting from the automatic segmentation. Image 810 shows seeds 812 applied by a user. The seeds 812 are voxels that were incorrectly included as part of the segmented bone structure. Accordingly, the seeds 812 are used as background seeds by the smart-editing algorithm. Image 820 shows the refined segmentation result 822 resulting from refinement of the segmentation results 802 using the smart-editing algorithm based on the seeds 812.

In an alternate embodiment, the segmentation results can be refined locally in a particular slice or view of the 3D medical image data. In this case, the user can view the bone segmentation in a certain slice (or mini-slice) and input seeds for foreground and/or background pixels in that slice. The foreground seeds are added to the segmented bone structure and the background seeds are subtracted from the segmented bone structure. A segmentation algorithm (e.g., random walker segmentation) is then run locally on the selected slice based on the foreground and background seeds, resulting in a local refinement of the bone segmentation results. This allows the user to make very accurate refinements of the bone segmentation locally in a selected slice (or mini-slice).

Returning to FIG. 5, once the bone segmentation results are refined at step 512, the method can repeat steps 506-510 to repeat the automatic landmark detection based on the refined bone segmentation results, output the refined bone segmentation results and landmark detection results, and determine whether the refined bone segmentation results are accurate.

At step 514, when it is determined that the bone segmentation results are accurate (e.g., a user accepts the segmentation results or does not request refinement of the segmentation results), the method ends. The output bone segmentation results and landmark detection results provide an accurate 3D model of the patient's joint region, which can be used to create a personalized patient proposal for joint replacement surgery in order to manufacture patient-specific cutting guides and plastic blocks for the joint replacement surgery.

Although not included in FIG. 5, the automatic bone segmentation may also include automatic segmentation of metal structures in the target joint area. In an advantageous implementation, metal structures are automatically segmented in the medical image data using intensity thresholding. Metal appears very bright in CT images and can therefore be accurately differentiated from bone structures and other tissue by extracting voxels having an intensity above a certain threshold.

Figure 9:
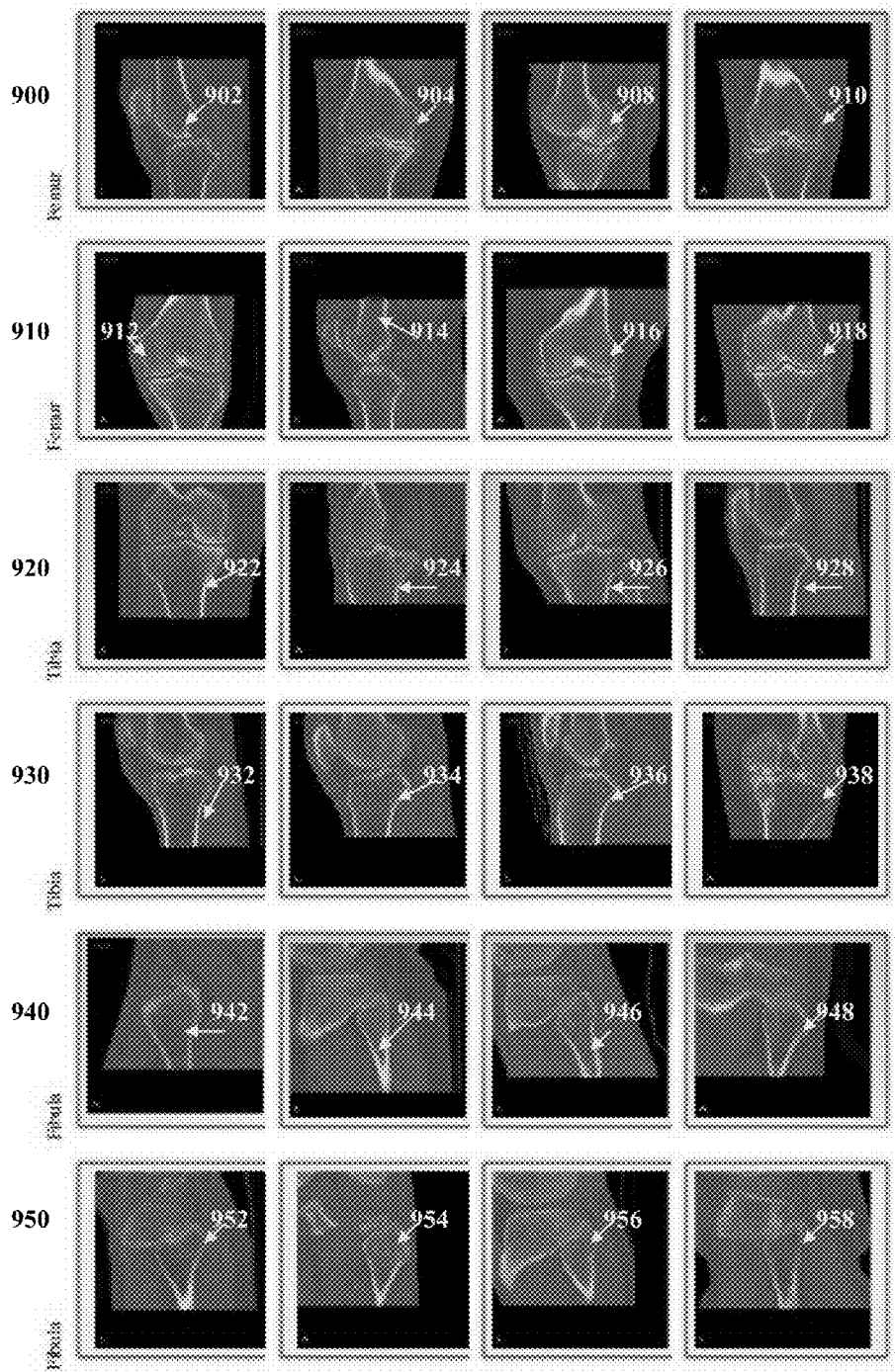
FIG. 9 illustrates exemplary segmentation results for the femur, tibia, and fibula.
Figure 10:
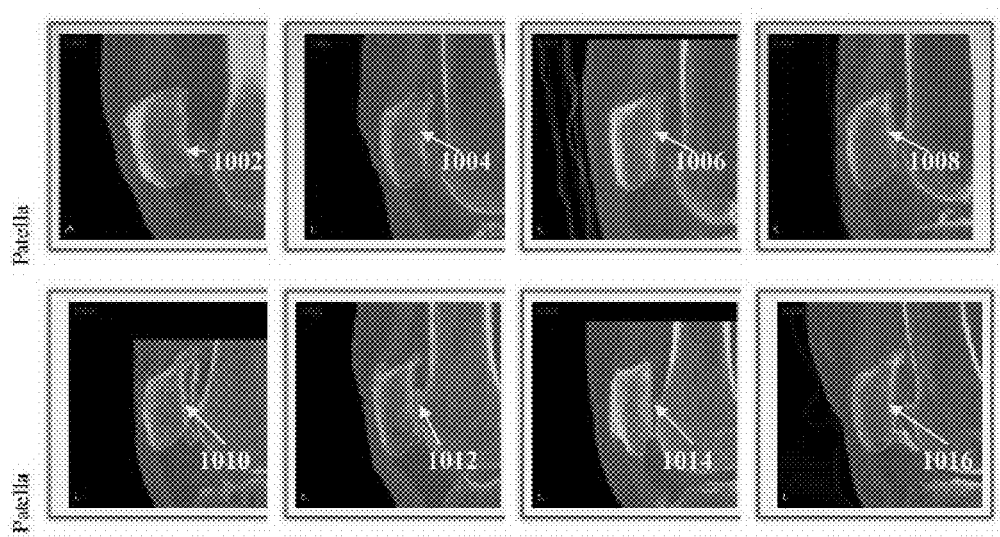
FIG. 10 shows exemplary patella segmentation results.

FIG. 9 illustrates exemplary segmentation results for the femur, tibia, and fibula. As shown in FIG. 9, rows 900 and 910 show femur segmentation results 902, 904, 906, 908, 912, 914, 916, and 918. Rows 920 and 930 show tibia segmentation results 922, 924, 926, 928, 932, 934, 936, and 938. Rows 940 and 950 show fibula segmentation results 942, 944, 946, 948, 952, 954, 956, and 958. FIG. 10 shows exemplary patella segmentation results 1002, 1004, 1006, 1008, 1010, 1012, 1014, and 1016.

Figure 11:
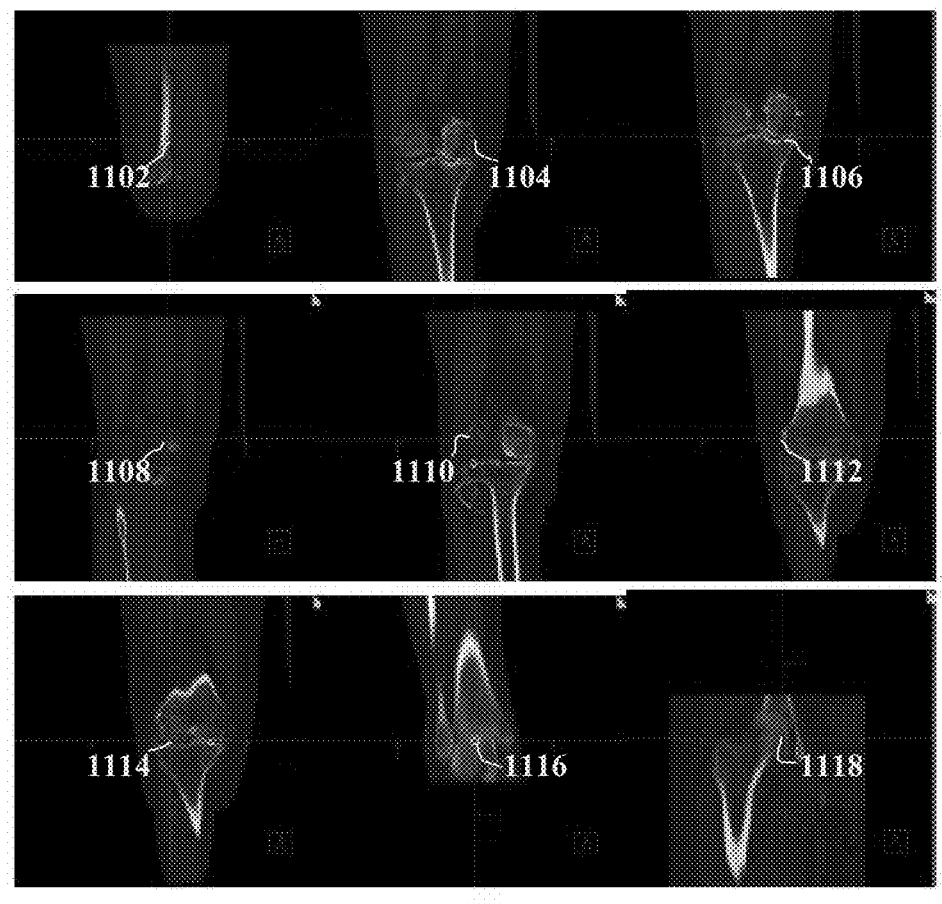
FIG. 11 shows exemplary landmark detection results for total knee replacement surgery planning.

FIG. 11 shows exemplary landmark detection results for total knee replacement surgery planning. As illustrated in FIG. 11, landmark detection results are shown for the femur anterior cortex point 1102, femur lateral epicondyle 1104, femur lateral most distal 1106, femur lateral posterior condyle point 1108, femur medial posterior condyle point 1110, femur medial epicondyle 1112, femur medial most distal 1114, ankle center 1116, and femoral head 1118.

Figure 12:
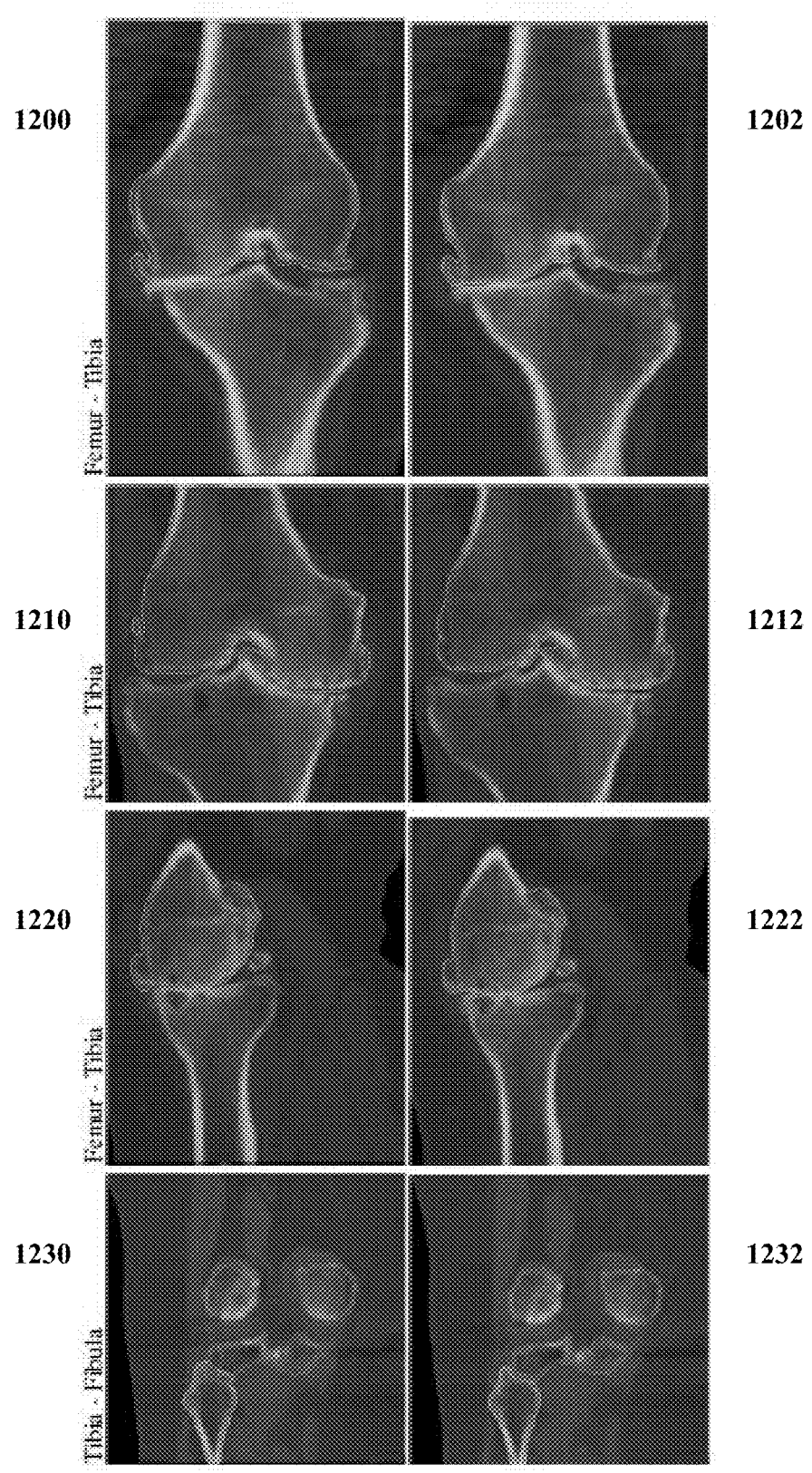
FIG. 12 illustrates bone segmentation results using independent bone segmentation and joint multi-bone segmentation.

FIG. 12 illustrates bone segmentation results using independent bone segmentation and joint multi-bone segmentation. As illustrated in FIG. 12, images 1200, 1210, and 1220 show segmentations results for the femur and tibia using independent bone segmentation and images 1202, 1212, and 122 show the segmentation results for the femur and tibia using joint multi-bone segmentation. Images 1230 and 1232 show segmentation results for the tibia and fibula using independent bone segmentation and joint multi-bone segmentation, respectively. As can be seen in FIG. 12, overlapping surfaces are removed and more accurate boundaries are segmented using the joint multi-bone segmentation.

Figure 13:
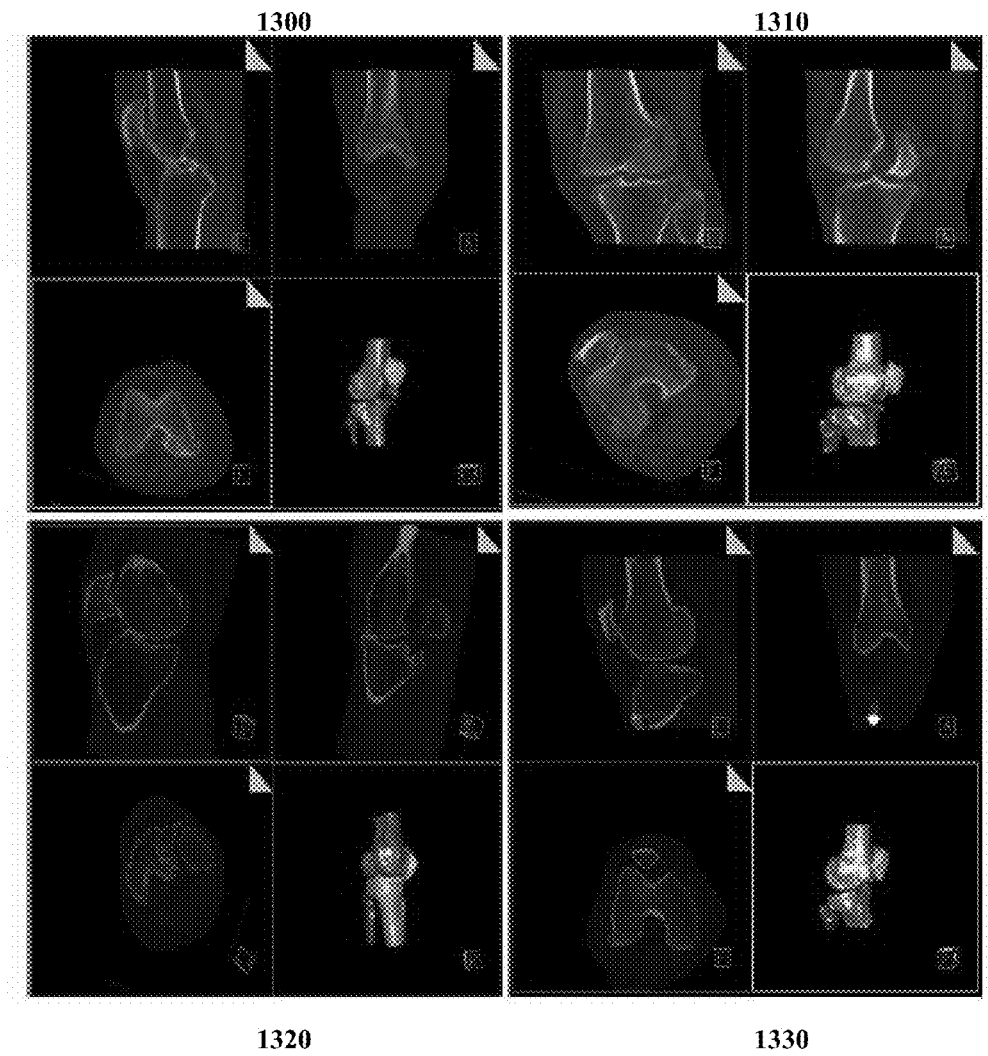
FIG. 13 illustrates exemplary bone segmentation results visualized in a user interface.

FIG. 13 illustrates exemplary bone segmentation results visualized in a user interface. As shown in FIG. 13, bone segmentation results 1300, 1310, 1320, and 1330 are each visualized in a user interface, such as the user interface 400 of FIG. 4, using a lateral view, frontal view, axial view, and 3D rendering.

Figure 14:
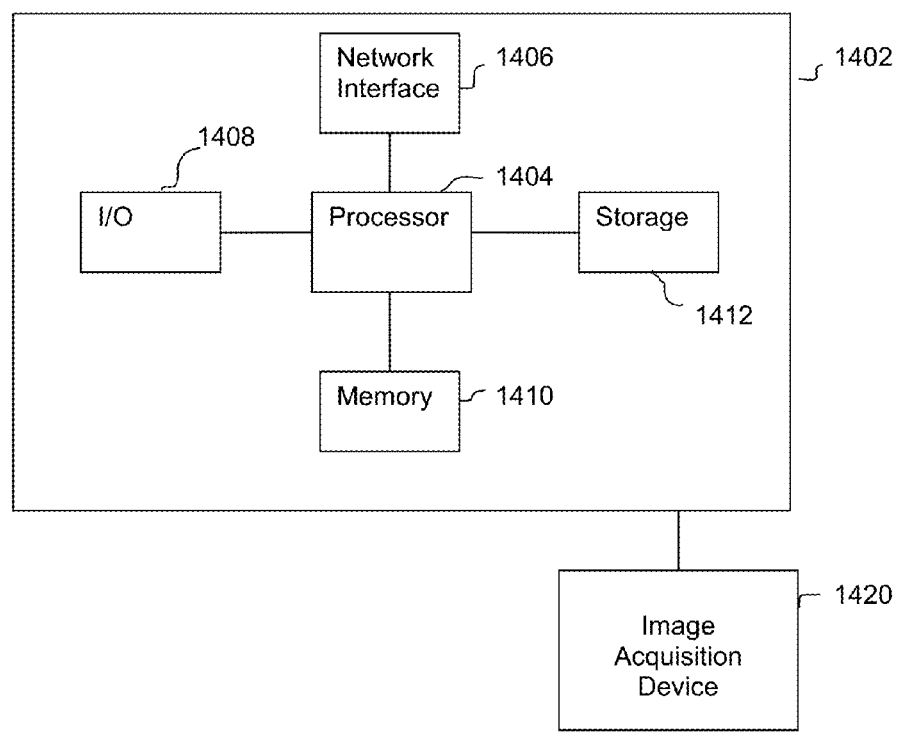
FIG. 14 is a high level block diagram of a computer capable of implementing the present invention.

The above-described methods for bone segmentation and automatic landmark detection for joint replacement surgery may be implemented on a computer using well-known computer processors, memory units, storage devices, computer software, and other components. A high level block diagram of such a computer is illustrated in FIG. 14. Computer 1402 contains a processor 1404 which controls the overall operation of the computer 1402 by executing computer program instructions which define such operation. The computer program instructions may be stored in a storage device 1412 (e.g., magnetic disk) and loaded into memory 1410 when execution of the computer program instructions is desired. Thus, the steps of the methods of FIGS. 3 and 5 may be defined by the computer program instructions stored in the memory 1410 and/or storage 1412 and controlled by the processor 1404 executing the computer program instructions. An image acquisition device 1420, such as a CT or MR scanning device, can be connected to the computer 1402 to input the 3D images (volumes) to the computer 1402. It is possible to implement the image acquisition device 1420 and the computer 1402 as one device. It is also possible that the image acquisition device 1420 and the computer 1402 communicate wiredly or wirelessly through a network. The computer 1402 also includes one or more network interfaces 1406 for communicating with other devices via a network. The computer 1402 also includes other input/output devices 1408 that enable user interaction with the computer 1402 (e.g., display, keyboard, mouse, speakers, buttons, etc.) One skilled in the art will recognize that an implementation of an actual computer could contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for bone segmentation and landmark detection for joint replacement surgery, comprising:
   receiving a 3D medical image of at least a target joint region of a patient;
   automatically segmenting a plurality bone structures in the target joint region of the 3D medical image by estimating, using trained discriminative classifiers, a shape for each of the plurality of bone structures in a respective learned shape space trained based on a database of training data; and
   automatically detecting a plurality of landmarks associated with a joint replacement surgery in the target joint region of the 3D medical image using respective trained landmark detectors.

2. The method of claim 1, wherein the target joint region is a knee region.

3. The method of claim 2, wherein automatically segmenting a plurality bone structures in the target joint region of the 3D medical image by estimating, using trained discriminative classifiers, a shape for each of the plurality of bone structures in a respective learned shape space trained based on a database of training data comprises;
   automatically segmenting a femur, tibia, fibula, and patella in the 3D medical image.

4. The method of claim 3, wherein automatically detecting a plurality of landmarks associated with a joint replacement surgery in the target joint region of the 3D medical image using respective trained landmark detectors comprises:
   automatically detecting a femur medial most distal, femur lateral most distal, femur lateral posterior condyle point, femur anterior cortex point, femur medial posterior condyle point, femoral head, and ankle center in the 3D medical image.

5. The method of claim 1, wherein automatically segmenting a plurality bone structures in the target joint region of the 3D medical image by estimating, using trained discriminative classifiers, a shape for each of the plurality of bone structures in a respective learned shape space trained based on a database of training data comprises:
   independently segmenting each of the plurality of bone structures in the 3D medical image.

6. The method of claim 1, wherein automatically segmenting a plurality bone structures in the target joint region of the 3D medical image by estimating, using trained discriminative classifiers, a shape for each of the plurality of bone structures in a respective learned shape space trained based on a database of training data comprises, for each of the plurality of bone structures:
   generating a mesh representing a boundary of the bone structure by estimating, in the 3D medical image, the shape in the learned shape space for the bone structure; and
   refining the mesh using a trained boundary detector.

7. The method of claim 6, wherein generating a mesh representing a boundary of the bone structure by estimating, in the 3D medical image, a shape in a learned shape space for the bone structure comprises:
   estimating pose parameters and shape space parameters to align the mesh for the bone structure to the 3D medical image.

8. The method of claim 6, wherein refining the mesh using a trained boundary detector comprises:
   adjusting each of a plurality of vertices of the mesh in a normal direction using the trained boundary detector.

9. The method of claim 1, wherein automatically segmenting a plurality bone structures in the target joint region of the 3D medical image by estimating, using trained discriminative classifiers, a shape for each of the plurality of bone structures in a respective learned shape space trained based on a database of training data comprises:
   jointly segmenting the plurality of bone structures using prior spatial constraints to prevent overlaps between the plurality of bone structures.

10. The method of claim 1, wherein automatically detecting a plurality of landmarks associated with a joint replacement surgery in the target joint region of the 3D medical image using respective trained landmark detectors comprises:
    automatically detecting the plurality of landmarks using the respective trained landmark detectors, wherein a search space for at least one of the respective trained landmark detectors is constrained based on at least one other landmark detection result.

11. The method of claim 10, wherein a search space for at least one of the respective trained landmark detectors is constrained based on the segmented bone structures.

12. The method of claim 1, wherein automatically detecting a plurality of landmarks associated with a joint replacement surgery in the target joint region of the 3D medical image using respective trained landmark detectors comprises:
    (a) for each undetected one of the plurality of landmarks, determining a search space for a corresponding trained landmark detector based on at least one detected one of the plurality of landmarks;
    (b) selecting the trained landmark detector having the smallest search space;
    (c) detecting, using the selected trained landmark detector, a corresponding one of the plurality of landmarks within the search space determined for the selected trained landmark detector; and
    (d) repeating steps (a)-(c) until no undetected ones of the plurality of landmarks remain.

13. The method of claim 1, further comprising:
    refining the segmented bone structures based on user inputs.

14. The method of claim 13, wherein refining the segmented bone structures based on user inputs comprises:
receiving user inputs corresponding to seed points in the segmented bone structures; and
refining the segmented bone structures by minimizing an energy functional based on the automatically segmented bone structures, the seed points, and image intensities of the 3D medical image.

15. The method of claim 13, wherein refining the segmented bone structures based on user inputs comprises:
receiving user inputs corresponding to seed points in a selected slice of the segmented bone structures; and
locally refining the segmented bone structures in the selected slice based on the received user inputs.

16. The method of claim 1, further comprising:
automatically segmenting metal structures in the target joint region of the 3D medical image.

17. An apparatus for bone segmentation and landmark detection for joint replacement surgery, comprising:
means for receiving a 3D medical image of at least a target joint region of a patient;
means for automatically segmenting a plurality bone structures in the target joint region of the 3D medical image by estimating, using trained discriminative classifiers, a shape for each of the plurality of bone structures in a respective learned shape space trained based on a database of training data; and
means for automatically detecting a plurality of landmarks associated with a joint replacement surgery in the target joint region of the 3D medical image using respective trained landmark detectors.

18. The apparatus of claim 17, wherein the target joint region is a knee region.

19. The apparatus of claim 18, wherein the means for automatically segmenting a plurality bone structures in the target joint region of the 3D medical image by estimating, using trained discriminative classifiers, a shape for each of the plurality of bone structures in a respective learned shape space trained based on a database of training data comprises:
means for automatically segmenting a femur, tibia, fibula, and patella in the 3D medical image.

20. The apparatus of claim 19, wherein the means for automatically detecting a plurality of landmarks associated with a joint replacement surgery in the target joint region of the 3D medical image using respective trained landmark detectors comprises:
means for automatically detecting a femur medial most distal, femur lateral most distal, femur lateral posterior condyle point, femur anterior cortex point, femur medial posterior condyle point, femoral head, and ankle center in the 3D medical image.

21. The apparatus of claim 17, wherein the means for automatically segmenting a plurality bone structures in the target joint region of the 3D medical image by estimating, using trained discriminative classifiers, a shape for each of the plurality of bone structures in a respective learned shape space trained based on a database of training data comprises:
means for independently segmenting each of the plurality of bone structures in the 3D medical image.

22. The apparatus of claim 17, wherein the means for automatically segmenting a plurality bone structures in the target joint region of the 3D medical image by estimating, using trained discriminative classifiers, a shape for each of the plurality of bone structures in a respective learned shape space trained based on a database of training data comprises:
means for jointly segmenting the plurality of bone structures using prior spatial constraints to prevent overlaps between the plurality of bone structures.

23. The apparatus of claim 17, further comprising:
means for refining the segmented bone structures based on user inputs.

24. The apparatus of claim 17, further comprising:
means for automatically segmenting metal structures in the target joint region of the 3D medical image.

25. A non-transitory computer readable medium storing computer program instructions for bone segmentation and landmark detection for joint replacement surgery, the computer program instructions when executed on a processor, cause the processor to perform operations comprising:
receiving a 3D medical image of at least a target joint region of a patient;
automatically segmenting a plurality bone structures in the target joint region of the 3D medical image by estimating, using trained discriminative classifiers, a shape for each of the plurality of bone structures in a respective learned shape space trained based on a database of training data; and
automatically detecting a plurality of landmarks associated with a joint replacement surgery in the target joint region of the 3D medical image using respective trained landmark detectors.

26. The non-transitory computer readable medium of claim 25, wherein the target joint region is a knee region.

27. The non-transitory computer readable medium of claim 26, wherein automatically segmenting a plurality bone structures in the target joint region of the 3D medical image by estimating, using trained discriminative classifiers, a shape for each of the plurality of bone structures in a respective learned shape space trained based on a database of training data comprises:
automatically segmenting a femur, tibia, fibula, and patella in the 3D medical image.

28. The non-transitory computer readable medium of claim 27, wherein automatically detecting a plurality of landmarks associated with a joint replacement surgery in the target joint region of the 3D medical image using respective trained landmark detectors comprises:
automatically detecting a femur medial most distal, femur lateral most distal, femur lateral posterior condyle point, femur anterior cortex point, femur medial posterior condyle point, femoral head, and ankle center in the 3D medical image.

29. The non-transitory computer readable medium of claim 25, wherein automatically segmenting a plurality bone structures in the target joint region of the 3D medical image by estimating, using trained discriminative classifiers, a shape for each of the plurality of bone structures in a respective learned shape space trained based on a database of training data comprises:
independently segmenting each of the plurality of bone structures in the 3D medical image.

30. The non-transitory computer readable medium of claim 25, wherein automatically segmenting a plurality bone structures in the target joint region of the 3D medical image by estimating, using trained discriminative classifiers, a shape for each of the plurality of bone structures in a respective learned shape space trained based on a database of training data comprises:
jointly segmenting the plurality of bone structures using prior spatial constraints to prevent overlaps between the plurality of bone structures.

31. The non-transitory computer readable medium of claim 25, wherein automatically detecting a plurality of landmarks associated with a joint replacement surgery in the target joint region of the 3D medical image using respective trained landmark detectors comprises:
  (a) for each undetected one of the plurality of landmarks, determining a search space for a corresponding trained landmark detector based on at least one detected one of the plurality of landmarks;
  (b) selecting the trained landmark detector having the smallest search space;
  (c) detecting, using the selected trained landmark detector a corresponding one of the plurality of landmarks within the search space determined for the selected trained landmark detector; and
  (d) repeating steps (a)-(c) until no undetected ones of the plurality of landmarks remain.

32. The non-transitory computer readable medium of claim 25, wherein the operations further comprise:
  refining the segmented bone structures based on user inputs.

33. The non-transitory computer readable medium of claim 25, wherein the operations further comprise:
  automatically segmenting metal structures in the target joint region of the 3D medical image.

* * * * *